United States Patent

[11] 3,598,159

[72] Inventor John A. MacIntyre
Barrington, R.I.
[21] Appl. No. 855,935
[22] Filed Sept. 8, 1969
[45] Patented Aug. 10, 1971
[73] Assignee U.S. Plush Mills, Inc.

[54] MULTILAYER FABRIC
2 Claims, 7 Drawing Figs.
[52] U.S. Cl. .................................................. 139/384
[51] Int. Cl. .................................................. D03d 1/02
[50] Field of Search ........................................ 139/383,
384, 387, 388, 389

[56] References Cited
UNITED STATES PATENTS
1,976,793 10/1934 Mangold ...................... 139/384
3,009,232 11/1961 Martin ......................... 139/384
3,102,559 9/1963 Koppelman et al. ......... 139/384

Primary Examiner—Henry S. Jaudon
Attorney—Barlow and Barlow

ABSTRACT: A woven fabric having a plurality of layers, there being outer layers and one or more intermediate layers between the outer layers, tying the outer layers together in such a way as to provide pockets extending warpwise in a generally honeycomb relation to prevent the outer layers from spreading beyond a limited distance when inflated, the opposite edges of the fabric being brought together by one outer layer joining another outer layer opposite it and providing a larger chamber which when inflated will provide a bulge at the opposite edges of the fabric extending lengthwise or warpwise of the fabric.

PATENTED AUG 10 1971  3,598,159
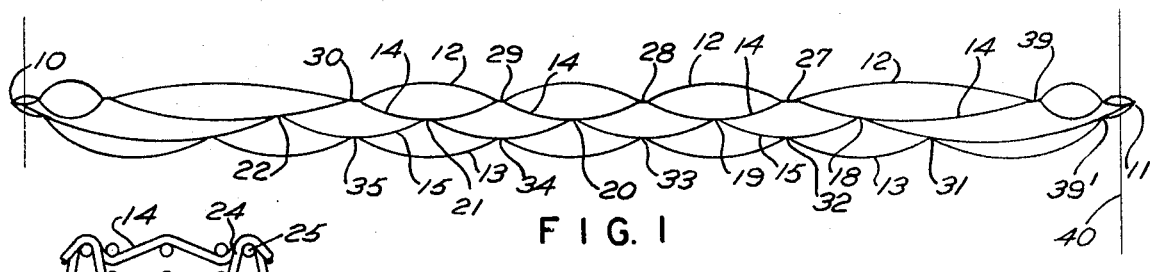
FIG. 1
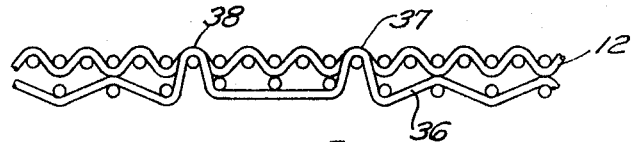
FIG. 2  FIG. 3
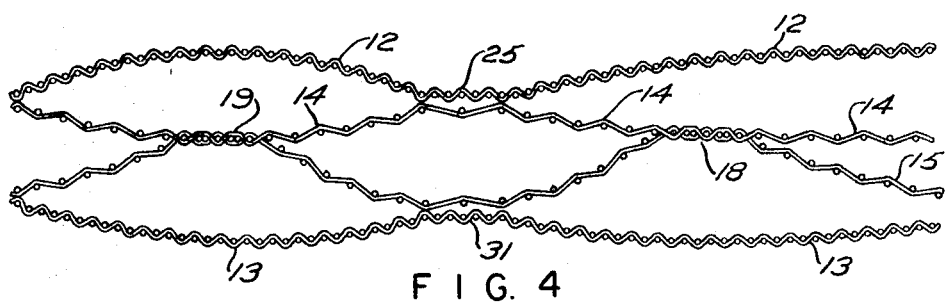
FIG. 4
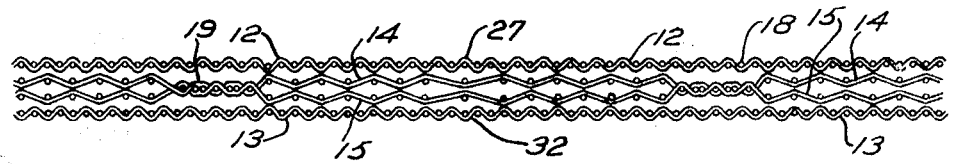
FIG. 5
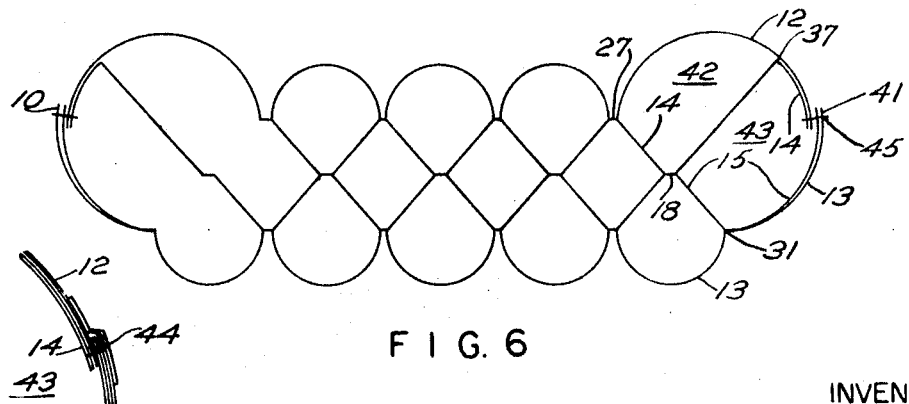
FIG. 6
FIG. 7
INVENTOR
JOHN A. MAC INTYRE
BY
Barlow & Barlow
ATTORNEYS 3,598,159

MULTILAYER FABRIC

BACKGROUND OF THE INVENTION

Inflatable fabrics having an end use such as an escape chute from an aircraft usually have outer plies or layers with strand or fabric cemented between the outer plies. Crossties, when cemented in, require hand labor and are not as strong as if they were woven into the top and bottom plies or layers.

SUMMARY OF THE INVENTION

This woven fabric comprises a plurality of plies or layers including outer plies or layers and fabric plies or layers intermediate the outer layers substantially coextensive weftwise and warpwise of the outer layers and between the outer layers and woven into the outer so as to control the separation of the outer layers when inflated, the layers being substantially coextensive weftwise provide a smooth surface for coating of the outer layers to make them air impervious. In a case where there is more than one intermediate layer, the intermediate layers are woven together in a narrow strip extending warpwise so that when the fabric is inflated a somewhat honeycomb relation is provided. The outer layers are joined together at the opposite edges of the fabric in a form to provide a large and relatively unsupported chamber which will provide a bulging at the opposite edges of the fabric extending warpwise thereof so that when inflation occurs the larger bulged edges will prevent to some extent a person or anything conveyed along the cute from slipping off the sides of the escape chute.

DESCRIPTION OF THE DRAWINGS

FIG. 1 is a schematic weftwise sectional view of the fabric as woven;

FIGS. 2 and 3 are fragmental warpwise sections showing on a larger scale the weaving connection between the layers;

FIG. 4 is a sectional schematic view similar to FIG. 1 but on a larger scale;

FIG. 5 is a sectional view similar to FIG. 4 with the fabric in collapsed relation;

FIG. 6 is a view similar to FIG. 1 after the fabric is in its completed form and inflated; and FIG. 7 is a large sectional view showing the overlapping relation of the top and bottom layers of the fabric and the covering strip over the joint.

DESCRIPTION OF THE PREFERRED EMBODIMENT

In FIG. 1 the full width of a woven fabric is illustrated with opposite selvages 10 and 11. This fabric is formed of a plurality of plies or layers of woven strands, there being shown a top outer layer 12 and a bottom outer layer 13. There are intermediate layers 14 and 15 also extending from selvage to selvage and coextensive warpwise with the outer layers.

It is intended that there be a coating applied to the outer layers 12 and 13 so that these layers will be air impervious and the fabric may be inflated. Fifty warps and 50 fillings per inch of 210 denier nylon have been found suitable for this outer ply or layer. However, the inner or intermediate fabric will not be coated and it is desired that air be circulatable through this inner or intermediate fabric, it being for the purpose of tying the outer fabrics together to control separation thereof. It has been found that 25 warps and 25 fillings per inch of 210 denier nylon is suitable for the intermediate ply or layer. It will also be understood that dacron or other materials may be substituted for the nylon if desired. One of the purposes of the entire structure is that it be light enough for compact packaging and storage.

The intermediate layers 14 and 15, reference being had more particularly to FIG. 1, are joined together at spaced points 18, 19, 20, 21 and 22 in a woven relation as shown in FIG. 2 by causing the warp thread 23 to be raised as at 24 into the path of the filling thread 25 of the adjacent layer so that a warp thread of each of these fabrics is common at this point of connection; that is, warp 23 which makes up the fabric 15 will also be a warp of the fabric 14 and by floating over a filling 26 in the fabric 15 the filling of 15 may move between the fillings of the layer 14 at this point of juncture, the warp threads thus tying the filling threads of each of these fabrics 14 and 15 together at this point and there being six filling threads involved in the strip of interweaving relation. The filling threads will be crowded a little closer together at this juncture of interweaving relation such as at the points 18 to 22 as shown in FIG. 1.

At points across the width of the fabric and substantially midway between the points of connection between the intermediate fabrics to each other such as 18 to 22 the intermediate fabrics are attached to the outer fabric layers in a similar woven relation. Thus the fabric 14 is attached to the outer fabric 12 at points 27, 28, 29 and 30 while the outer fabric 13 is attached to the intermediate fabric 15 at points 31, 32, 33, 34 and 35. These points of attachment are similarly provided by the warp threads 36 (see FIG. 3) becoming common to the fabric 12 and 14 at point 37 and point 38 as shown in FIG. 3, and here the weft threads will be seven in number and will be somewhat crowded together as drawn together by the common warp threads. Similarly the layers 13 and 15 will be tied together at 31 and 32 and so forth by a common warp thread being located in the fabric 13 and the weft threads of each of these fabrics being crowded together more closely at the weaving points tying these two fabrics together.

At the outer opposite edges of the fabric, the ties between the outer layers 12 and 13 are located at a greater distance than the ties between these layers in the midportion of the fabric. Thus the tie between the inner layer and outer layer 12 at 39 is a greater distance from either the tie at 18 and 27 and the tie between the layer 15 and 13 at 39' is greater than the tie between these layers at 31 and 32. By this arrangement if the selvage at 11 is cut off as shown by the dotted line 40 and the layers 12 and 14 are brought together with the layers 13 and 15 into a somewhat overlapping relationship as shown at 41 in FIG. 6, a much larger unsupported cell or chamber such as 42 and 43 (FIG. 6) is provided, there being only supports at 27, 31 and 18. Thus when inflation occurs, there will be a larger bulging relation at the edges and a generally thicker construction from top to bottom at the opposite edges than there is intermediate the edges which is desirable in an escape chute as it provides a somewhat trough to assist in guiding a person sliding down a chute.

The fabric such as above described provides substantially smooth outer surfaces on the two outer layers as seen in FIG. 5 which is highly desirable from a coating standpoint as a knife or coating spreader can much better perform over a smooth surface or one which has substantially even thickness throughout. Such a coating will be performed before the operation above described of cutting the selvages and securing the opposite edges of the layers of the fabric together.

The securing of the opposite edges of the fabric together in an overlapping relation such as in FIG. 6 will usually be performed by some cementing operation and be supplemented by a covering tape 44 also cemented over the joint. However, if additional securing is desired, there may be a tacking by sewing indicated by line 45 in FIGS. 6 and 7.

I claim:

1. A woven fabric comprising a plurality of layers including outer layers with at least one intermediate layer extending substantially coextensively weftwise of the outer layers and between said outer layers and secured alternately to one outer layer and the other outer layer at least one of the securings being by weaving the layers together warpwise thereof, said opposite outer layers being joined at their opposite warpwise extending edges forming a chamber between said outer layers, said intermediate layers being tied to said outer layers at points spaced weftwise thereof with the ties adjacent the edges spaced from the edges a greater distance than the intermediate ties between said intermediate layers and the outer layers whereby a larger unsupported section is formed along the edges to provide a thicker section along the opposite warpwise edges when inflated.

2. A woven fabric as in claim 1 wherein there are two intermediate layers extending between the outer layers, said intermediate layers being secured together by weaving and one intermediate layer being secured to one outer layer by weaving and the other intermediate layer being secured to the other outer layer by weaving.